United States Patent

[11] 3,616,177

[72] Inventor Carl Gumerman
 West Chester, Pa.
[21] Appl. No. 858,890
[22] Filed Sept. 17, 1969
[45] Patented Oct. 26, 1971
[73] Assignee E. I. du Pont de Nemours and Company
 Wilmington, Del.

[54] LAMINAR STRUCTURES OF POLYIMIDES AND WIRE INSULATED THEREWITH
4 Claims, No Drawings

[52] U.S. Cl. .................................................. 161/165,
 161/189, 161/227, 174/110 FC, 174/120 SR,
 174/121 SR
[51] Int. Cl. ...................................................... H01b 3/44,
 B32b 27/30, B32b 27/28
[50] Field of Search .......................................... 161/165,
 189, 227; 174/120 SR, 121 SR, 110 FC

[56] References Cited
UNITED STATES PATENTS
| | | | |
|---|---|---|---|
| 2,833,686 | 5/1958 | Sandt ............................ | 156/309 |
| 3,179,635 | 4/1965 | Frost et al. .................... | 260/78 |
| 3,206,344 | 9/1965 | Elkins ............................ | 156/86 |
| 3,356,551 | 12/1967 | Glenn et al. .................. | 156/49 |
| 3,422,215 | 1/1969 | Humes .......................... | 174/120 |

FOREIGN PATENTS
1,039,967  8/1966  Great Britain ................

Primary Examiner—Harold Ansher
Attorney—Claude L. Beaudoin

ABSTRACT: A laminar article is provided of a layer of a polyimide and a layer of a fluorinated polymer, which structure is suitable in the form of narrow tapes for electrical insulation uses.

LAMINAR STRUCTURES OF POLYIMIDES AND WIRE INSULATED THEREWITH

THE INVENTION

The present invention relates laminar structures. More particularly, the present invention is directed to improvements in and relating to laminar articles of polyimides and fluorinated polymeric materials.

Laminar articles of polyimide polymeric materials and fluorocarbon polymers are known articles of manufacture desirable for many diverse uses because characterized by a unique combination of physical properties not separately possessed by each individual constituent material thereof. An important use of such laminar structures is as an insulation for electrical conductors. The main drawback of such laminar structures especially such structures as are heat-sealed on metal conductors, resides in the inability to readily remove or strip the insulation material from the conductor. In many end-uses it is important that the insulation be removable from the end of the metal conductor without damage to the conductor by nicking or scoring. This is accomplished by cutting the insulation most of the way through and sliding the part to be removed (waste slug) off the end of the conductor. The spirally wound insulation material, usually applied to the conductor in film or tape form and heat-sealed thereon and which experiences some degree of shrinkage during the heat-sealing step, is quite difficult to remove. This is true for both polyimide/FEP tape and FEP/polyimide/FEP tape, since in the case of polyimide against metal the coefficient of friction is high, and in the case of FEP against metal the thermoplastic FEP tends to bond to the metal surface during the heat-sealing step.

It is the principal object of the present invention to provide a novel heat-sealable polyimide film which is easily stripped from electrical conductors.

According to the present invention there is provided a laminar structure comprising at least three layers including a base layer of a polyimide, a layer of a fluoroethylenepropylene (FEP) copolymer and a layer of a polytetrafluoroethylene (PTFE) polymeric material. The laminar structure preferably comprises a base layer of a polyimide, a layer of a FEP copolymer adhered to both surfaces of said polyimide layer and a layer of a polytetrafluoroethylene (PTFE) adhered to one of said FEP layers.

The laminar structure of the invention is characterized by a base layer of a polyimide of the following recurring structural unit:

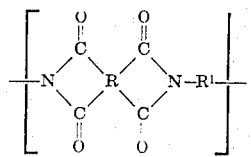

where R is a tetravalent aromatic organic radical including the following and substituted derivatives thereof:

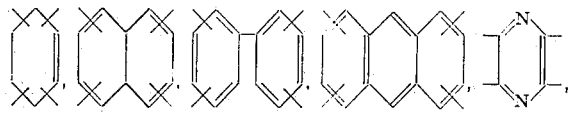

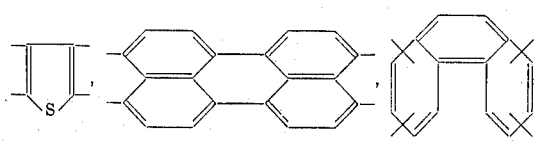

and

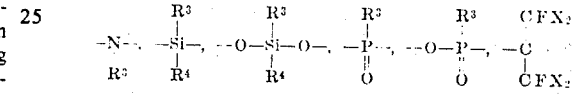

where $R^2$ is alkylene of 1-3 carbon atoms, oxygen, sulfur or one of the following:

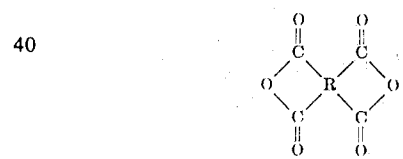

and $-\overset{CF_3}{\underset{|}{CH}}-$ wherein $R^3$ and $R^4$ are alkyl or aryl, and substituted groups thereof, and each X is separately chosen from the group consisting of F and Cl. the said R being such as obtained from a dianhydride of the formula

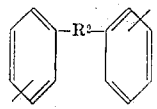

where R has the same meaning as above; and where $R^1$ is a divalent aromatic radical (arylene), preferably one of the following groups: phenylene, naphthylene, biphenylene, anthrylene, furylene, benzfurylene, and wherein $R^2$ is as defined above. The $R^1$ groups are conveniently derived from organic diamines having the formula $H_2N-R^1-NH_2$ where $R^1$ is as above defined. In such R radicals indicated hereinabove having free valances shown in indefinite positions, the free valences are so disposed that they are two pairs of valences, each pair being either ortho or peri.

Suitable polyimides for the laminar structure of the present invention include such as are derived from the following dianhydrides:

pyromellitic dianhydride;
3,4,9,10-perylenetetracarboxylic dianhydride;
Naphthalene-2,3,6,7-tetracarboxylic tetracarboxylic dianhydride;
Naphthalene-1,4,5,8-tetracarboxylic tetracarboxylic dianhydride;

bis (3,4-dicarboxyphenyl) ether dianhydride;
bis(3,4-dicarboxyphenyl)sulfone dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic tetracarboxylic dianhydride;
pyrazine-2,3,5,6-tetracarboxylic tetracarboxylic dianhydride;
benzene-1,2,3,4,tetracarboxylic dianhydride;
thiophene-2,3,4,5-tetracarboxylic dianhydride;
2,3,2',3'-benzophenonetetracarboxylic dianhydride
3,4,3',4'-benzophenonetetracarboxylic dianhydride;
benzoylpyromellitic dianhydride;
6-(3',4'-dicarboxybenzoyl)-2,3-naphthalene dicarboxylic dianhydride;
4'-(3'',4''-dicarboxybenzoyl)-3,4-diphenyl dicarboxylic dianhydride;
4-(3',4'-dicarboxybenzoyloxy)phthalic dianhydride;
4-(3',4'-dicarboxybenzamido)phthalic dianhydride;
bis(3,4-dicarboxyphenyl)sulfide dianhydride;
bis(2,3-dicarboxyphenyl)methane dianhydride;
bis(3,4-dicarboxyphenyl)methane dianhydride;
1,1-bis(2,3-dicarboxyphenyl)ethane dianhydride;
1,1-bis(3,4-dicarboxphenyl)ethane dianhydride;
2,2-bis(2,3-dicarboxyphenyl)propane dianhydride;
2,2-bis(3,4-dicarboxyphenyl)propane dianhydride;
2,2-bis(3,4-dicarboxyphenyl)-1,1,1-trifluoroethane dianhydride;
2,2-bis(3,4-dicarboxyphenyl)hexafluoropropane dianhydride;
2,2-bis(3,4-dicarboxyphenyl)-1-chloro-1,1,3,3,3-pentafluoropropane dianhydride;
2,2-bis(3,4-dicarboxyphenyl)-1,3-dichloro-1,1,3,3,-tetraflouropropane dianhydride;
2,2-bis(3,4-dicarboxyphenyl)-1,1,3,3-tetrachloro-1,3-difluoropropane dianhydride;
position isomers of the above, etc., and mixtures thereof.

Suitable polyimides for the laminar structure of the present invention also include such as are derived from the following diamines:
meta-phenylenediamine;
para-phenylenediamine;
2,2-bis(4-aminophenyl)propane;
4,4'-diaminodiphenylmethane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
bis(3-aminophenyl)diethyl silane;
benzidine;
3,3'-dichlorobenzidine;
3,3'-dimethoxybenzidine;
4,4'-diaminobenzophenone;
N,N-bis(-aminophenyl)-n-butylamine;
N,N-bis(4-aminophenyl)methylamine;
1,5-diaminonaphthalene;
3,3'-dimethyl-4,4'-diaminobiphenyl;
m-aminobenzoyl-p-aminoanilide;
4-aminophenyl-3-aminobenzoate;
1,1-bis(4-aminophenyl)ethane
4,4'-diaminodiphenyl sulfoxide
3,3'-diaminobenzophenone;
2,2'-diamonobenzophenone;
2,2-bis(4-aminophenyl)hexafluoropropane;
2,2-bis(4-aminophenyl)-1,3-dichloro-1,1,3,3-tetrafluoropropane;
N,N-bis(4-aminophenyl)aniline;
2,4-bis(beta-amino-t-butyl)toluene;
bis(p-beta-amino-t-butylphenyl)ether;
p-bis-2-(2-methyl-4-aminopentyl)benzene;
P-bis(1,1-dimethyl-5-aminopentyl)benzene;
m-xylylenediamine;
p-xylylenediamine;
position isomers of the above, etc., and mixtures thereof.

The polyimides and polyamide acids are more fully described in patents such as U.S. Pat. No. 3,179,614 and U.S. Pat. No. 3,179,634. The thickness of the polyimide layer is between about 0.25 mil and about 5 mils, preferably between 0.5 and 2.0 mils.

The laminar structure of the invention is further characterized by a layer of FEP fluorocarbon copolymeric material adhered to one or both surfaces of the polyimide layer. The term "FEP" as used herein means copolymers of tetrafluoroethylene and hexafluoropropylene. The fluorocarbon polymers are extensively described in such patents as, for example, U.S. Pat. No. 2,833,686 and U.S. Pat. No. 2,946,763. The layer of FEP fluorocarbon copolymer is preferably a copolymer of between about 50 percent and about 95 percent tetrafluoroethylene and between about 5 percent and about 50 percent of hexafluoropropylene, especially wherein the amount of hexafluoropropylene is between about 7 percent and about 27 percent. The thickness of the FEP fluorocarbon copolymer layer is preferably between about 0.05 mil and about 0.3 mil.

The third component of the laminar structure of the present invention is a homopolymer of tetrafluoroethylene (PTFE), and can be of the type described by Berry in U.S. Pat. No. 2,559,750 and U.S. Pat. No. 2,559,752. The thickness of the PTFE layer is preferably between about 0.05 mil and about 0.3 mil. Optionally, the PTFE layer may be blended with FEP. For example, this layer may be a composition consisting of the above described third component or a blend consisting of 50 to 100 percent PTFE and 0 to 50 percent FEP. Preferably, the composition is 70 to 100 percent PTFE and 0 to 30 percent FEP.

Several laminar structure of different construction can be made with the component materials in accordance with the present invention. For example, such structure comprises one layer of each component wherein the polyimide layer is in contact on one surface with the FEP layer and on the other surface with the PTFE or PTFE-FEP blend layer whereby to provide a three-layer laminar structure. Another structure comprises a layer of polyimide covered on both sides with the FEP layer and wherein one surface of the latter is covered with a layer of the PTFE or PTFE-FEP blend layer. Various processes are available for making the novel laminar structures of the present invention. Each fluorocarbon polymer layer is conveniently applied as an aqueous polymer dispersion. More specifically, FEP polymer can be applied to the polyimide substrate as a layer about 0.02 to 1.0 mil, and preferably 0.04 to 0.3 mil, of an aqueous dispersion of a colloidal copolymer of hexafluoropropylene and tetrafluoroethylene, said copolymer having a hexafluoropropylene content of 5 to 50 percent by weight, and preferably 7 to 27percent by weight, and a specific melt viscosity of 1,500 to 300,000 poises, said dispersion having a solids content in the range of about 5 to 65percent at a temperature in the range of from about room temperature up to about 60°C., and heating the composite article at a temperature in the range of from about 325° to 450° C. and preferably 370° to 450° C. for a period of about 0.25 to 15 minutes and preferably 0.5 to 3 minutes. A PTFE polymer layer can be applied to either the polyimide substrate or the FEP layer as a colloidal aqueous dispersion having a solids content of 5 to 65 percent; for this material the temperature for drying and coalescing of the polymer should be in the range of 325° to 510° C. Layers of PTFE-FEP blends are applied in the same way. This process is described in more detail in pending application Ser. No. 541,073, filed Apr. 8, 1966, now abandoned.

It is preferred that the three-layer structures be made by first one-side coating the base with an aqueous dispersion of PTFE, followed by coating on the other side with an aqueous FEP dispersion. This sequence is preferred to the reverse sequence, since a higher temperature is required for sintering the PTFE to make it adhere properly to the polyimide base than is required for sintering the FEP coating. In the reverse sequence, heating the FEP coating to the higher sintering temperature of PTFE results in discoloration of the former and tends to have a deleterious effect on the polyimide/FEP bond. Blends of PTFE and FEP do not require as high a sintering temperature as PTFE alone, but somewhat higher than FEP alone. Thus, while the sequence of coating PTFE-FEP blend first and FEP second has less deleterious effect than when PTFE alone is coated first, it nevertheless is preferable to apply the PTFE-FEP blend coating first and the FEP coating second.

The four-layer structures described above are made by first two-side coating the base polyimide with an aqueous FEP dispersion followed by overcoating on one side with an aqueous dispersion of PTFE or PTFE-FEP blend. No deleterious effect appears in this sequence of operations since the temperature required to bond the PTFE or PTFE-FEP blend to the FEP layer is well below the temperature required for bonding PTFE or the blend to polyimide. Accordingly, the deleterious effect on the FEP/polyimide bond described in the previous paragraph does not occur in this situation.

The laminar film structure of the present invention is useful for electrical insulation purposes. The films are preferably slit into narrow widths to provide tapes. The tape is wound around the electrical conductor in preferably spiral fashion and overlapped on itself. The amount of overlap can vary, depending upon the angle of wrap. The tension employed during the wrapping operation also varies widely, and can vary from just enough tension to prevent wrinkling to a tension high enough to stretch and neck down the tape. Even when the 1 is low, a snug wrap results since the tape shrinks to a certain extent under the influence of heat during the ensuing heat-sealing operation. Heat-sealing of the tape is accomplished by treating the tape-wrapped conductor at a temperature and for a time sufficient to fuse the FEP layer of the construction. The heat-sealing temperature required can range from about 290° to 500° C. or higher, depending on many factors such as the insulation thickness, the number of layers of insulation, the gauge of the metal conductor (which acts as a heat sink) the speed of the production line, length of the sealing oven, etc.

The strip force required to remove a 1-inch long waste slug of insulation from an electrical conductor will depend on a number of factors, such as the tension used during the taping operation, the angle of wrap used, the nature of the metal surface, and the wire gauge (since the total area of contact between film and metal for a slug 1 inch long will be greater for wires of greater thickness). Since a wire installer in removing a waste slug can physically exert only a given effort which is independent of the above-listed factors, it is desirable that it be possible to remove a waste slug 1 inch long with a force of about 5 pounds or less, and preferably 3 pounds or less, regardless of the enumerated factors. This goal is accomplished with the novel laminar structures of the present invention. Use of these structures with the PTFE or PTFE-FEP blend surface placed against the metal conductor provides the desired performance. When blends are used, about 50 percent or more PTFE is desirable and about 70 percent or more is preferred. The percentages given are only approximate in view of the variability in strip force introduced by the factors listed above.

Films coated on both exterior surfaces with PTFE or a PTFE-FEP blend are found not to be satisfactory since they do not heat seal under those conditions which are suitable for sealing films having an FEP coating. It has also been found that within the films defined in the present invention, the FEP surface heat seals more readily to a PTFE-FEP blend better than to PTFE, and within the blends the heat-sealing performance improves as the proportion of FEP in the blend increases. Accordingly, the most highly preferred composition of the film surface which will contact metal electrical conductors is that consisting of 70 to 90 percent by weight PTFE and 10 to 30 percent by weight FEP, since this range provides the best balance of easy stripping and satisfactory heat sealing.

In order to be able to use properly the asymmetric structures of this invention (different layers or coatings on opposite sides), it is preferable to distinguish between the two sides of the film, and thus identify which is the surface to be placed in contact with the metal electrical conductor. Otherwise, the tape may be wound with the wrong side against the electrical conductor. While identification can be done by proper labeling of all rolls as having the "modified" (i.e., the PTFE or PTFE-FEP blend) surface facing in, toward the roll core, or out, away from the core, as appropriate, it is usually desirable to provide a more positive means for distinguishing the two sides. One simple way to do this is to put a small amount of pigment into one of the two coatings. It is preferable for easiest identification always to place the pigment only in the PTFE or PTFE-FEP blend layer. The pigment employed may be any of the commonly employed white or colored pigments, such as titanium dioxide, basic zinc chromate, oxides of iron, phthalocyanine greens and blues, chrome green, chrome yellow, cadmium selenide red, lamp black, quinacridon, molybdenum chromate, indanthrone, perylene, pyranthrone, pyraxolone, imidazole, anthanthrone, flavanthrone, etc. Only small amounts of pigment need be employed. Amounts between 0.1 percent and 5 percent by weight are found suitable, but greater and lesser amounts may also be used. It is necessary only to impart a visible degree of opacity or color.

The utility of the laminar structures of the present invention is in general similar to that of other well-known polyimide films. For example, tapes of the laminar structure of various widths humidity and useful as insulation when wrapped on electrical wire and cable. The film being heat-sealable, the tape can be sealed in place after wrapping and is especially useful for wire and cable which must resist exposure to high and low temperature stress.

The particular advantage of the laminar structures of this invention over those of the prior art lies in their superior retention of bond strength under conditions of high temperature and high humidity and their ease of strippability from electrical conductors when compared to the heat-sealable polyimides previously available.

The principle and practice of the present invention will now be illustrated by the following examples which are provided to show the practice and use thereof.

The test samples of the laminar structures prepared in the following examples were evaluated in accordance with the following testing procedure:

HEAT-SEAL STRENGTH is measured by cutting a piece of the laminar film test sample of 4 inches by 10 inches, with the grain of the film running in the long or machine direction, into two pieces each of 4 inches by 5 inches. The two test pieces are placed in superposed relation so that opposing FEP fluorocarbon polymer surfaces or FEP to PTFE or PTFE to PTFE surfaces thereof are in contact. The superimposed films are then sealed together at each end at right angles to the grain of the film by means of a ¾-inch wide sealing bar that is heated to a temperature of 350° C. and contacts the film ends at 20 p.s.i. pressure for 30 seconds. The sealed test samples are then cut in half at right angles to the grain of the film, and the two resulting pieces are each cut along their centerline and parallel to the grain of the film to provide 1-inch wide strips. The resulting four sets of strips are tested for heat-seal strength by securing the free ends thereof in a Suter testing machine and pulling the test samples apart. The highest force in grams required to pull the strips apart is taken as a measure of the heat-seal bond strength.

STRIPPING FORCE required to remove a waste slug of insulation 1 inch long is measured on a tensile testing machine in the following way. The insulation is removed from one end of the test specimen; the length of conductor bared need only be enough to enable it to be firmly grasped by one of the pairs of jaws of the tensile tester. The other end of the test specimen is cut off to leave a 1inch length of undisturbed insulation; this cut is made with a scissors-type wirecutter (not a diagonal cutter) so that the test result is not affected by a flattened or crushed wire end. The bare end of the test specimen is inserted through a hole in a 1/32-inch metal plate (the diameter of the hole should be 0.002 to 0.005 inch larger than the diameter of the metal conductor of the test specimen, and may have a shallow countersink to aid in inserting the specimen), and the plate is mounted in a supporting yoke which holds this plate perpendicular to the direction of pull in the tester. The yoke is clamped in one pair of jaws of the tester, and the bare conductor in the other pair of jaws. The wire specimen is pulled through the hole of the plate at a rate of 10 to 12 in./min. (leaving the slug of insulation behind). The maximum force required is recorded. Several specimens for a given test sample are run, and the results averaged.

EXAMPLE 1

A 1 mil film of the polypyromellitimide of bis-(4-aminophenyl) ether was one-side coated with polytetrafluoroethylene (PTFE) by kiss-coating onto one side of the film a 20 percent solids aqueous polytetrafluoroethylene dispersion (a commercially available 60 percent solids dispersion diluted with water to 20 percent solids), passing the coated film between doctor rolls set with an opening slightly greater than 2 mils, contacted with a series of smoothing rolls, and dried in an oven heated at 420° to 440° C. The reverse side of the film was then coated with an 85/15 tetrafluoroethylene/hexafluoropropylene copolymer (FEP) by kiss-coating onto that side of the film a 20 percent solids aqueous FEP polymer dispersion (a commercially available 55 percent solids dispersion diluted with water to 20 percent solids), passing the coated film between doctor rolls set with an opening slightly greater than 2 mils, contacted with a series of smoothing rolls, and dried in an oven heated at about 345° C.

EXAMPLE 2

Example 1 was repeated, with the exception that in place of the first PTFE coating there was applied a 75 percent /25 percent / PTFE/FEP blend by kiss-coating onto the first side of the film a 20 percent solids aqueous blend of the 75 percent/25 percent PTFE/FEP blend of polymer dispersions prepared from the two polymers described in example 1 diluted with water to the indicated solids content; the oven temperature for this step was about 390° C.

EXAMPLE 3

Example 2 was repeated, but with the following differences. In place of the 75percent/25percent PTFE/FEP blend, an 80percent/20 percent blend was used, and the oven temperature was about 480° C. The oven temperature for the reverse side, FEP coating step was about 455° c. The coated film thickness was 1.18 mils. Samples of the film were heat sealed at 350° C. under 20 p.s.i. for 20 sec.; the heat-seal strengths were as follows:
FEP-side-to-FEP-side 955 g./in.
FEP-side-to-PTFE-side 942 g./in.
PTFE-side-to-PTFE-side 287 g./in.

EXAMPLE 4

Example 3 was repeated; except that in place of the 80percent/20percent PTFE/FEP blend, a 90percent/10percent blend was used, and the oven temperature was in the range of 480° to 505° C. The final coated film thickness was 1.23 mils.

EXAMPLE 5

Example 2 was repeated, but with the following differences. In place of the 75percent/25percent PTFE/FEP blend, a 50percent/50percent blend was used (prepared from 10 pounds of a 60 percent solids PTFE aqueous dispersion, 11 pounds of a55 percent solids FEP polymer aqueous dispersion, 39 pounds of water, and 27 grams of "Carbopol" 960 surfactant), and the oven temperature was 385° to 390° C.

EXAMPLE 6

Example 2 was repeated, but with the following differences. In place of the 75 percent/25 percent PTFE/FEP blend, a 25 percent/75percent blend was used (prepared from 4.6 pounds of a 60 percent solids PTFE aqueous dispersion, fifteen pounds of a 55 percent solids FEP polymer aqueous dispersion, 35 pounds of water, and 27 grams of "Carbopol" 960 surfactant), and the oven temperature was 340° to 355° C.

EXAMPLE 7

A roll of 1-mil film of the polypyromellitimide of bis-(4-aminophenyl) ether was two-side coated with FEP polymer by dipping the film into a 20 percent solids FEP aqueous dispersion (of the type described in example 1), passing it between doctor rolls set with a clearance slightly greater than 3 mils, contacting the film with a series of smoothing rolls, and drying and sintering the FEP coating in an oven at about 455° C. This film was then overcoated on one side with PTFE by kiss-coating onto one side of the film a 40 percent solids aqueous polytetrafluoroethylene dispersion containing 1 percent by weight (based on polymer solids) of L–77 organosilicone surfactant (supplied by Union Carbide), passing it between doctor rolls set with a clearance slightly greater than 2 mils, and drying and sintering the PTFE coating in an oven heated in the range 455° to 485° C. Samples of the film were heat sealed, FEP-side-to-FEP-side, and exhibited bond strength of 985 g./in. The average thickness of the PTFE layer was estimated to be 0.06 mil.

EXAMPLE 8

Example 7 was repeated with some minor differences. The oven temperature used in the first step (FEP) coating was 340° to 345° C. For the second step PTFE coating, the coating bath was 20 percent solids, and the oven temperature was 325° to 330° C. The heat-seal strength, FEP-side-to-FEP-side, was 1,000 g./in., and FEP-side-to-PTFE-side, was 600 g./in. The average thickness of the PTFE layer was estimated to be 0.12 mil.

EXAMPLE 9

Lengths of No. 20 (American Wire Gauge) wire were spirally wrapped with tapes of the films of examples 1, 2, 5, 6 and 8, with the PFTE or PTFE–FEP blend surface against the metal conductor. The tapes were one-fourth inch wide and were wound with 50 percent overlap. In each case a second wrap was made with ¼-inch wide tape of 1-mil polyimide coated on each side with about 0.1 mil of FEP polymer, again with 50 percent overlap. Two control samples representative of the prior art constructions were also prepared.

Control A was wrapped with two layers of tape of 1-mil polyimide film coated on each side with about 0.1 mil of FEP polymer.

Control B was wrapped first with a tape of 1-mil polyimide film coated on one side with about 0.5 mil of FEP polymer, with the polyimide side against the metal conductor, and then wrapped with a tape of -mil polyimide film coated on both sides with about 0.1 mil of FEP polymer.

In all cases the insulation was heat-sealed in place by passing the wrapped wire through an oven heated at about 455° C.

The force necessary to remove a waste slug of insulation from each of these test wires was measured in accordance with the procedure described above and the results are tabulated below:

| Wire | Strip Force |
| --- | --- |
| Example 1 | 2.6 lbs. |
| Example 2 | 5.1 lbs. |
| Example 5 | 5.5 lbs. |
| Example 6 | 10.1 lbs. |
| Example 8 | 5.5 lbs. |
| Control A | 9.5 lbs. |

| Control B | 8.3 lbs. |
|---|---|

After stripping the waste slug of Control A, there was considerable FEP polymer remaining adhered to the metal conductor, which interfered with soldering operation. In the case of the wire of example 6 there was some (but less) fluoropolymer contamination of the wire surface, which again interfered with soldering. There was virtually no contamination of the wire surface in the case of examples 1, 2, 5 and 8 (and none in the case of Control B),

EXAMPLE 10

Lengths of No. 20 (American Wire Gauge) stranded silver-plated copper conductor were wrapped with ¼-inch wide tapes of the films of examples 3, 4 and 7, and with PTFE or PTFE–FEP blend surface against the metal conductor. A control wire representative of a prior art construction was made with a ¼-inch tape of 1-mil polyimide film coated on one side with 0.5 mil of FEP polymer, with the polyimide side against the metal conductor. All wires received a second wrap of 5/16-inch wide tape of 1-mil polyimide film coated on each side with about 0.1 mil of FEP polymer; this tape was applied at a taping angle of about 15° from the longitudinal direction of the wire. Two different clutch settings were used to provide different wrapping tensions. The tape overlap was a nominal 50 percent for both first and second wraps, but because of neckdown of the tape during wrapping at the higher tension, the overlap was somewhat below 50 percent at this tension level. In all cases, the insulation was heat-sealed in place by passing the wrapped wire through an oven at 480° to 485° C. The strip force necessary to remove a 1-inch waste slug of insulation from each wire was measured, and results are tabulated below:

| Wire | Strip Force Low Wrapping Tension | High Wrapping Tension |
|---|---|---|
| Example 3 | 1.7 lbs. | 2.5 lbs. |
| Example 4 | 2.6 lbs. | 2.6 lbs. |
| Example 7 | 3.0 lbs. | 3.1 lbs. |
| Control | 5.4 lbs. | 6.8 lbs. |

EXAMPLE 11

Lengths of No. 20 (American Wire Gauge) stranded silver-plated copper conductor were wrapped with ¼-inch wide tapes of the films of examples 3, 4, 7 and 8, with the PTFE or PTFE–FEP blend surface against the metal conductor. A control wire representative of a prior art construction was made with a ¼ tape of 1-mil polyimide film coated on one side with 0.5 mil of FEP polymer, with the polyimide side against the metal conductor. All wires received a second wrap of 5/16-inch wide tape of 1-mil polyimide film coated on each side with 0.5 mil of FEP polymer; this tape was applied at a taping angle of about 15° from the longitudinal direction of the wire. Several different clutch settings were used to provide different wrapping tensions, thus varying both neckdown and overlap as in example 10. In all cases the insulation was heat-sealed in place by passing the wrapped wire through an oven at 480° to 485° C. The strip force necessary to remove a 1-inch waste slug of insulation from each wire was measured, and the results are tabulated below:

| Wire | Low Wrapping Tension | Strip Force Intermediate Control Tension | High Wrapping Tension |
|---|---|---|---|
| Example 3 | 2.1 lbs. | 2.8 lbs. | 3.0 lbs. |
| Example 4 | 1.9 lbs. | 2.8 lbs. | 3.1 lbs. |
| Example 7 | 1.8 lbs. | 2.1 lbs. | 2.8 lbs. |
| Example 8 | 0.6 lbs. | 3.1 lbs. | 3.6 lbs. |
| Control | 3.8 lbs. | 7.3 lbs. | 5.5 lbs. |

EXAMPLE 12

Lengths of No. 20 (American Wire Gauge) stranded silver-plated copper conductor were wrapped with ¼-inch wide tapes of the films of examples 3, 4, 7 and 8, with the PTFE or PTFE–FEP blend surface against the metal conductor. A control wire representative of a prior art construction was made with a ¼-inch tape of 1-mil polyimide film coated on one side with 0.5 mil of FEP polymer, with the polyimide side against the metal conductor. All wires received a second wrap of ¼-inch wide tape of 1-mil polyimide film coated on each side with 0.5 mil of FEP polymer; this tape was applied at a taping angle of about 40° from the longitudinal direction of the wire. Several different clutch settings were used to provide different wrapping tensions, thus varying both neckdown and overlap as in examples 10 and 11. In all cases the insulation was heat-sealed in place by passing the wrapped wire through an oven at 480° to 485° C. The strip force necessary to remove a 1-inch waste slug of insulation from each wire was measured, and the results are tabulated below:

| Wire | Low Wrapping Tension | Strip Force Intermediate Wrapping Tension | High Wrapping Tension |
|---|---|---|---|
| Example 3 | 4.6 lbs. | | |
| Example 4 | 5.0 lbs. | | |
| Example 7 | 5.2 lbs. | | |
| Example 8 | 3.6 lbs. | 3.6 lbs. | 5.0 lbs. |
| Control | 9.1 lbs. | 16.6 lbs. | 15.5 lbs. |

The strip forces observed in this example are seen to be significantly higher than those of the previous examples. The difference is attributed to the high taping angle of this example, 40° from the wire axis, as compared to the low taping angle of examples 10 and 11. The taping angle is in part a matter of choice dependent on the amount of overlap desired, and in part dictated by the width of the tape used. At low wrapping angles, the film shrinkage (primarily in the longitudinal direction of the tape) is primarily in the longitudinal direction of the wire; there is little shrinkage perpendicular to the wire direction, and thus little snugging of the tape against the wire. At high wrapping angles, the film shrinkage (still primarily in the longitudinal direction of the tape) has a greater component perpendicular to the longitudinal direction of the wire; consequently there is significant snugging of the tape against the wire, and the force required to slide a waste insulation slug from the wire is a great deal higher. This is especially true at high wrapping tensions, for the stretching of the tape at higher tensions leads to greater shrinkage during heat sealing.

EXAMPLE 13

Tape ¼-inch wide) of 1-mil polyimide film carrying approximately 0.1 mil of FEP polymer on each side was coated with a coating composition consisting of four parts of a 55 percent solids aqueous PTFE dispersion and one part of a white pigmented ink having a PTFE base (Stanmark white ink 189–102, supplied by Standard T. Chem. Co., Inc., the solids of this ink is believed to be about 50 percent PTFE and 50 percent titanium dioxide), using a drawdown rod. The coating was dried at 130° to 135° C., then cured and sintered at about 370° C. Parts of the tape were given multiple coatings on the same side to build up thicker coatings of the pigmented PTFE. In this way, pigmented PTFE coatings of 0.2, 0.3, 0.4 and 0.6 mils were attained. The PTFE surface of this tape was easily distinguished from the FEP surface on the other side, by virtue of the white pigment in the PTFE coating.

Lengths of No. 20 (American Wire Gauge) 19-strand silver-plated copper unilay wire were wrapped with the above tapes (right hand lay at 52.5 percent overlap) with the pigmented PTFE surface against the metal conductor, and then wrapped with ¼-inch tape of 1-mil polyimide film having 0.1 mil of FEP polymer on each side (left-hand lay at 51.5 percent overlap). The insulation was heat-sealed in place by passing the wire through an oven heated at 480° to 485° C. A control wire representative of a prior art construction was similarly prepared, using two wraps of tape of 1-mil polyimide film having 0.1 mil of FEP polymer on each side. The strip force necessary to remove a 1-inch slug of insulation was measured as described above, and the results are tabulated below:

| Wire | Strip Force |
| --- | --- |
| 0.2 mil PTFE coating | 3.2 lbs. |
| 0.3 mil PTFE coating | 1.5 lbs. |
| 0.4 mil PTFE coating | 0.9 lbs. |
| 0.6 mil PTFE coating | 1.2 lbs. |
| Control | 4.9 lbs. |

The stripped ends of these wires were dipped in soft solder at 550° F. for 5 seconds. The wires from which the tapes of this example had been removed readily accepted solder. The wire from which the control insulation had been removed did not solder well because of residual FEP resin remaining on the wire.

What is claimed is:

1. A laminar sheet structure comprising
  a. a polyimide core consisting essentially of the polypyromellitimide of bis(4-aminophenyl) ether having a thickness of about from 0.25 to 5 mils;
  b. a layer of fluoroethylenepropylene copolymer bonded to a first side of the core and consisting essentially of about from 7 to 27 percent by weight, based upon the total copolymer weight, of hexafluoropropylene and about from 73 to 93 percent by weight, based on the total copolymer weight, of tetrafluoroethylene, the layer having a thickness of about from 0.05 to 0.3 mil; and
  c. a layer bonded to a second side of the core and consisting essentially of about from 100 to 50 percent polytetrafluoroethylene and about from 0 to 50 percent fluoroethylenepropylene copolymer, the layer having a thickness of about from 0.05 to 0.3 mil.

2. A laminar sheet structure of claim 1 further comprising a layer of fluoroethylenepropylene copolymer of the same range of composition and thickness as layer (b), and bonded to the second side of the core between the core and layer (c).

3. A laminar sheet structure comprising
  a. a polyimide core consisting essentially of the polypyromellitimide of bis(4aminophenyl) ether having a thickness of about from 0.25 to 5 mils;
  b. a layer of fluoroethylenepropylene copolymer bonded to a first side of the core and consisting essentially of about from 7 to 27 percent by weight, based upon the total copolymer weight, of hexafluoropropylene and about from 73 to 93 percent by weight, based on the total copolymer weight, of tetrafluoroethylene, the layer having a thickness of about from 0.05 to 0.3 mil; and
  c. a layer bonded to a second side of the core and consisting essentially of a blend of about from 95 to 50 percent polytetrafluoroethylene and about from 5 to 50 percent fluoroethylenepropylene copolymer, the layer having a thickness of about from 0.05 to 0.3 mil.

4. A laminar sheet structure of claim 3 further comprising a layer of fluoroethylenepropylene copolymer of the same range of composition and thickness as layer (b), and bonded to the second side of the core between the core and layer (c).

* * * * *